June 14, 1955  J. W. HALPERN  2,710,728
PNEUMATIC CONVEYOR SYSTEMS
Filed June 29, 1950  8 Sheets-Sheet 1

INVENTOR:
Johannes Wolfgang Halpern

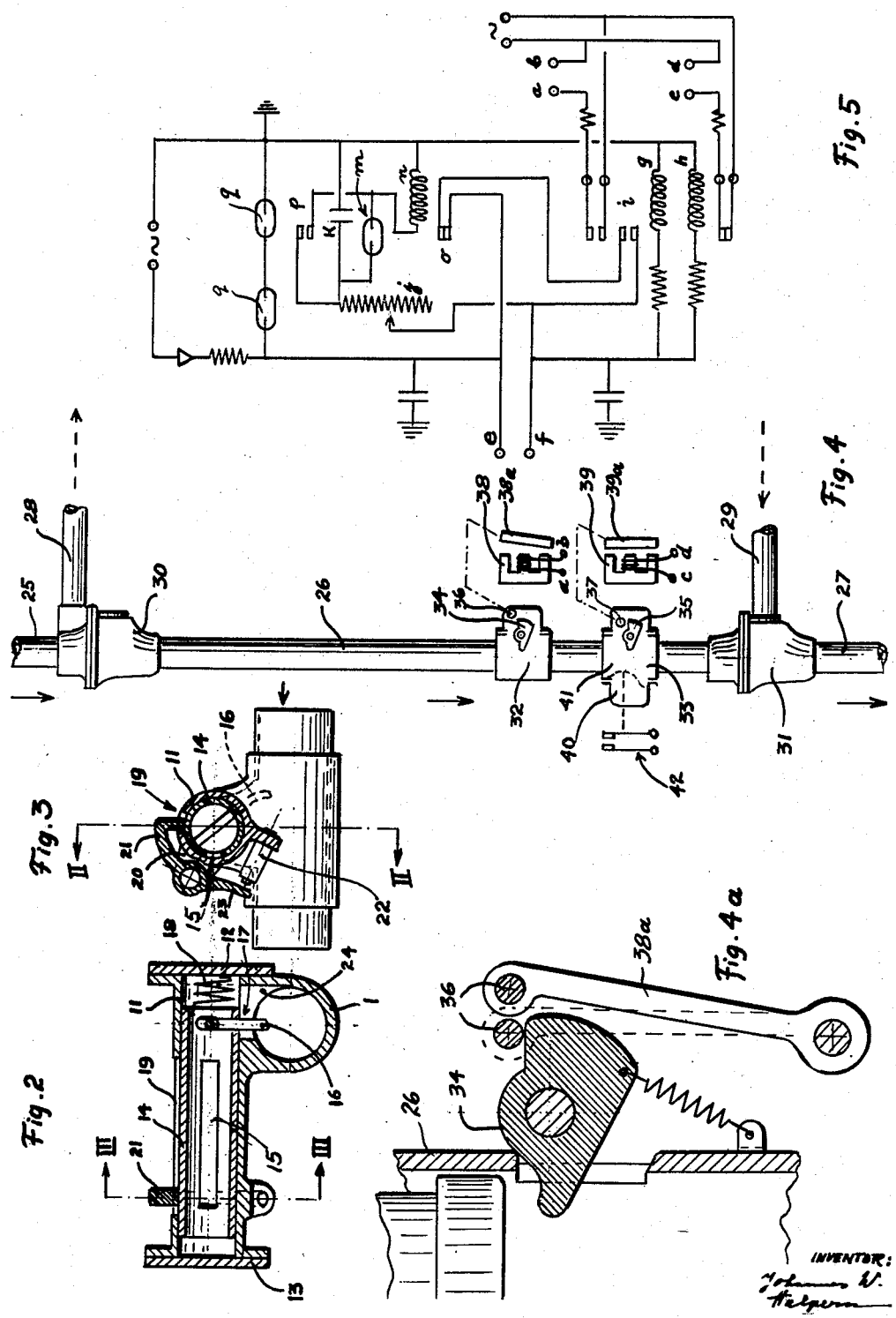

June 14, 1955 J. W. HALPERN 2,710,728
PNEUMATIC CONVEYOR SYSTEMS
Filed June 29, 1950 8 Sheets-Sheet 3
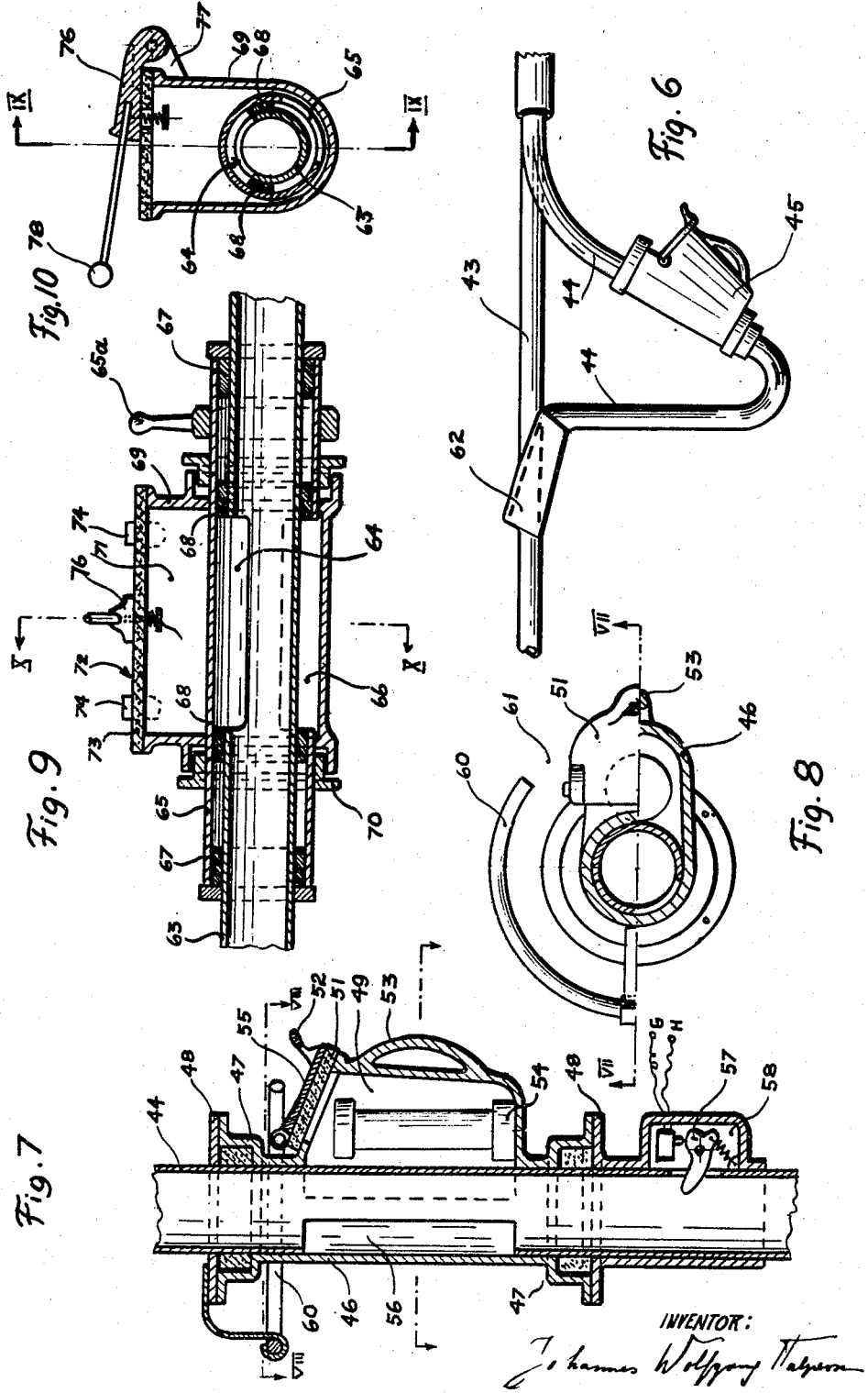
INVENTOR:
Johannes Wolfgang Halpern

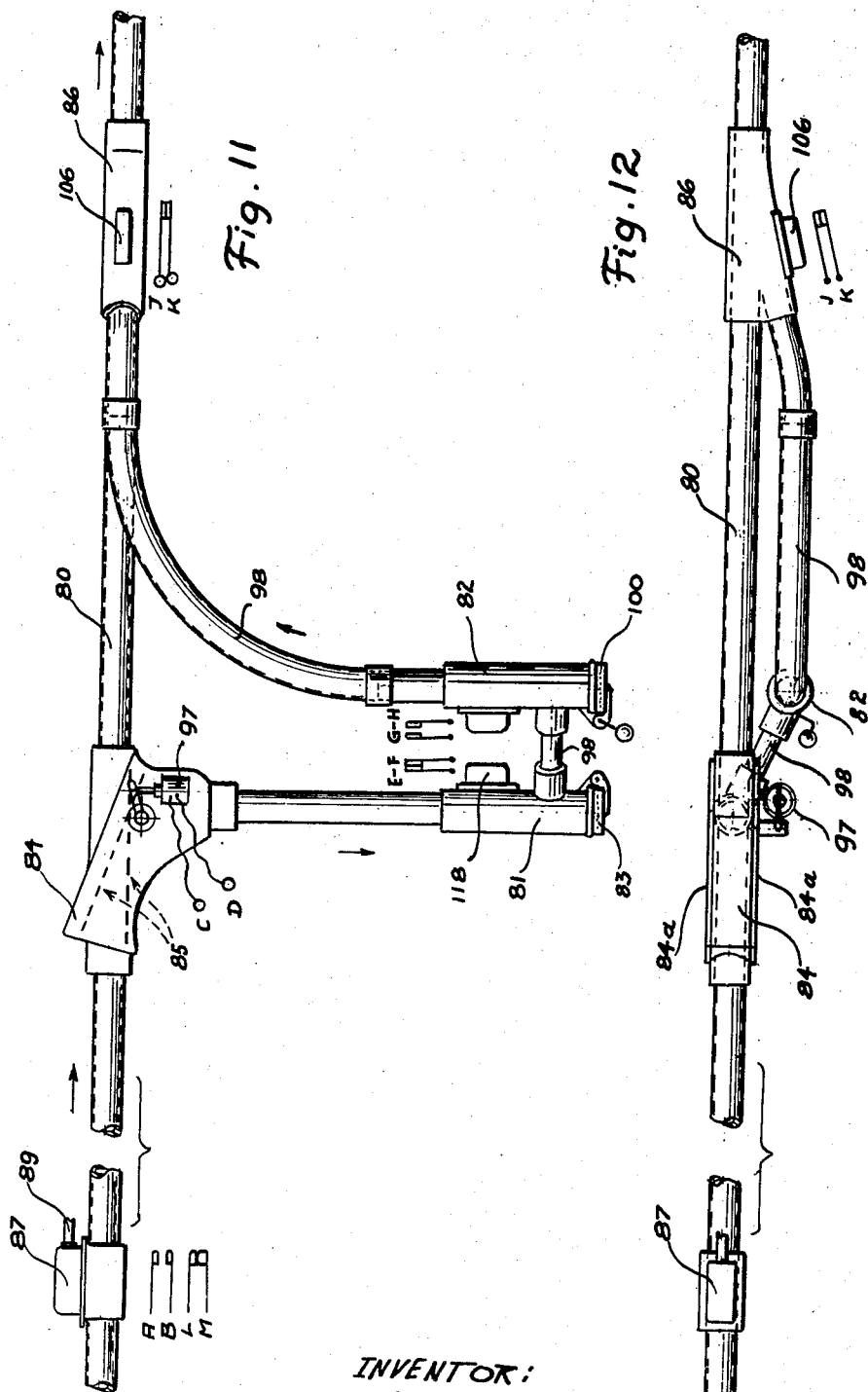

June 14, 1955  J. W. HALPERN  2,710,728
PNEUMATIC CONVEYOR SYSTEMS
Filed June 29, 1950  8 Sheets-Sheet 5
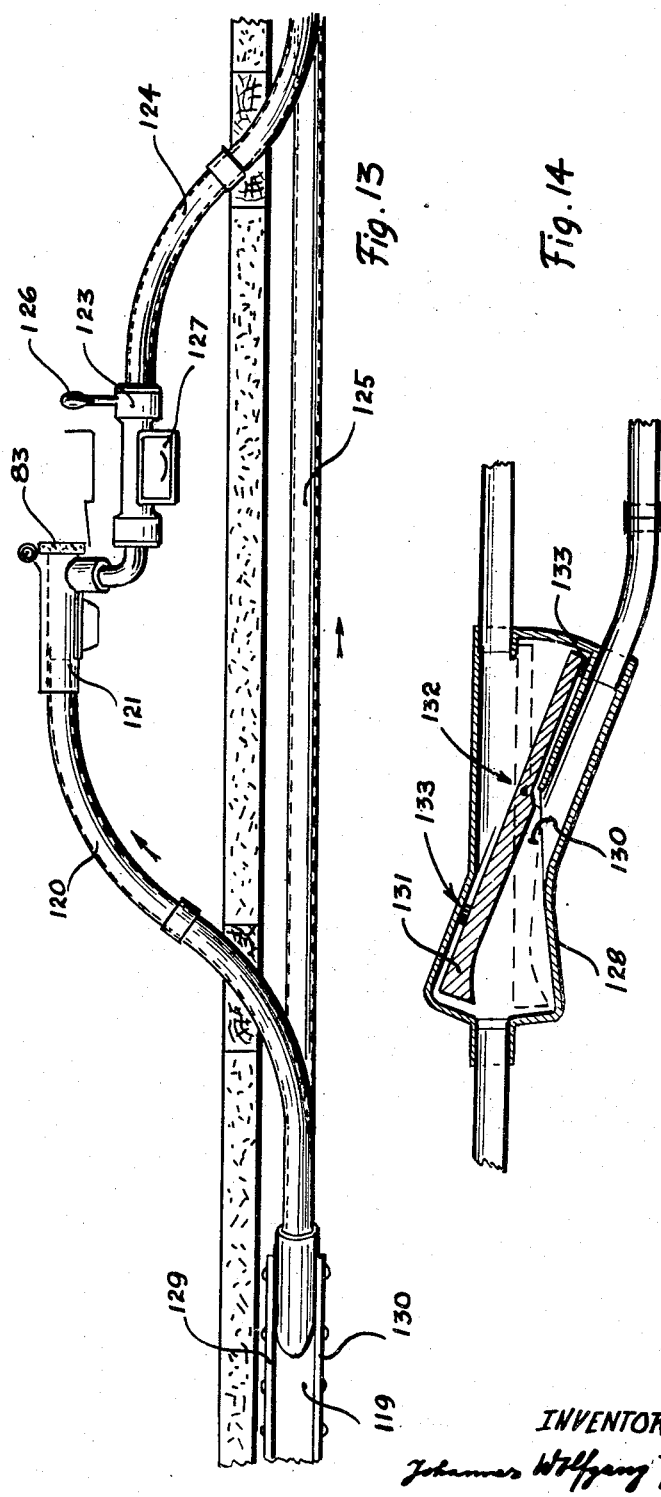
INVENTOR:
Johannes Wolfgang Halpern June 14, 1955  J. W. HALPERN  2,710,728
PNEUMATIC CONVEYOR SYSTEMS
Filed June 29, 1950  8 Sheets-Sheet 6
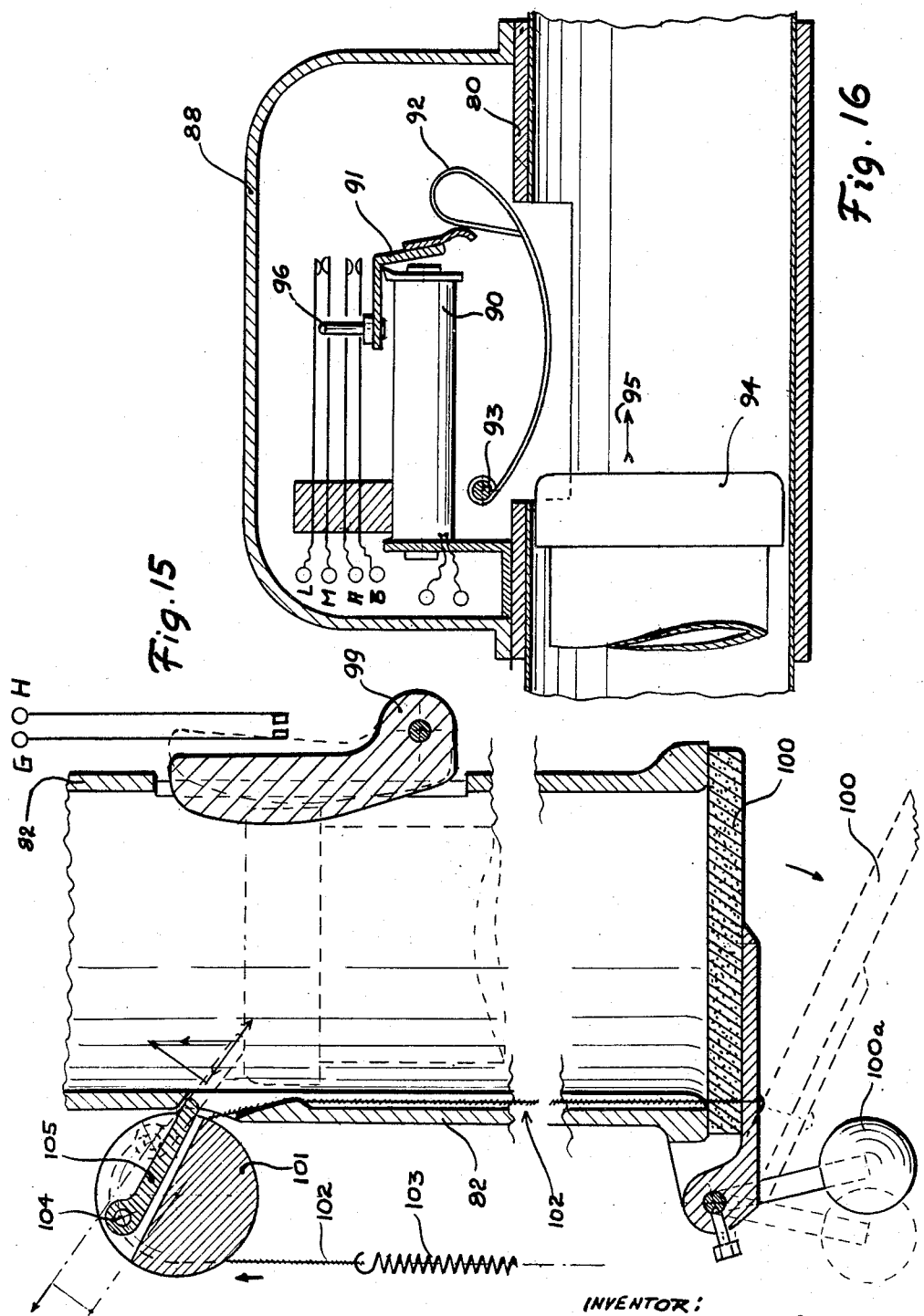
INVENTOR:
Johannes Wolfgang Halpern June 14, 1955 — J. W. HALPERN — 2,710,728
PNEUMATIC CONVEYOR SYSTEMS
Filed June 29, 1950 — 8 Sheets-Sheet 7

INVENTOR:
Johannes Wolfgang Halpern

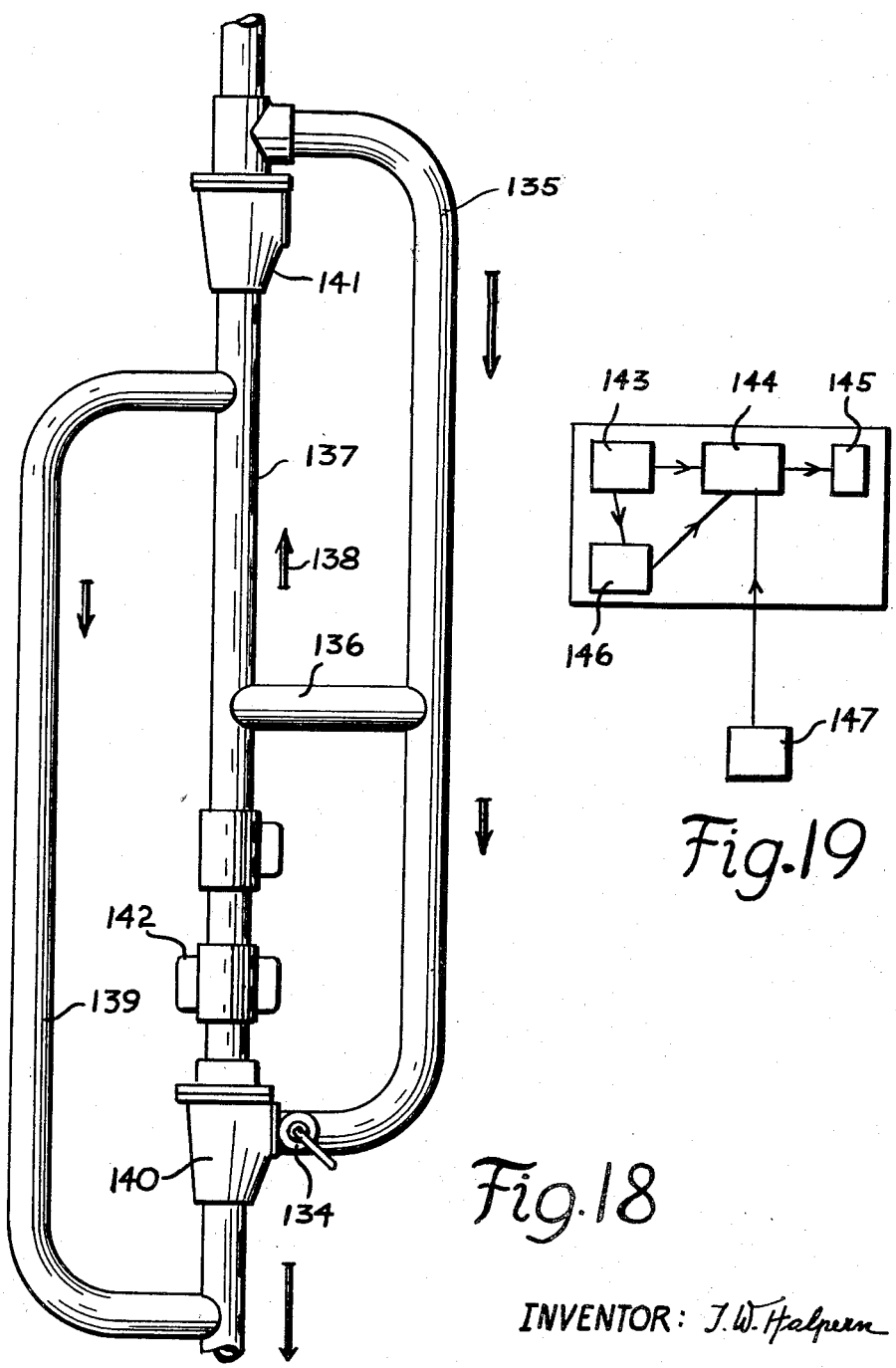

United States Patent Office 2,710,728
Patented June 14, 1955

2,710,728

PNEUMATIC CONVEYOR SYSTEMS

Johannes Wolfgang Halpern, Northampton, England

Application June 29, 1950, Serial No. 177,351

12 Claims. (Cl. 243—18)

The present invention relates to improvements in pneumatic conveyor systems of the kind in which a tubular carrier by means of an air flow is conveyed from one station to another through a tube system.

The hitherto known pneumatic conveyor systems employ a plurality of tubes for despatching and receiving the carrier, converging at a central station where transfer of carriers from one line to another is carried out either manually or automatically. These known systems are expensive and complicated and create difficulties in installation, because the system requires a considerable number of tubes, and a large power plant.

The main object of the present invention is to provide a pneumatic conveyor system which can be economically operated for long distance transmission and may include a considerable number of stations, and which may be installed at a comparatively low cost.

Another object of the invention is to provide means by which a considerable number of stations are enabled to despatch and receive over a single tube line.

A still further object of the invention is the utilization of a single main line for serving a considerable number of stations without causing jamming in traffic along the said tube line.

The invention has for object furthermore to provide means of deviating the carriers into branch lines leading to stations.

Means are likewise provided in the system according to the invention for retaining a permanent and at all times undisturbed air flow in the transmission line, and likewise to reduce the required air volume to a minimum.

Likewise means are provided according to the invention to simplify installation of the plant, and to render it more adaptable to existing building constructions, and furthermore to render possible the arrangement and placing of stations to conform to local conditions and at any desired distance from the main line.

These and other objects of the invention are attained by means of a single closed line being provided with a branch loop for each dispatch and receiving station, and associated with each loop a traffic controlling device in the main tube for selective receiving at each receiving station and for timing the despatch of carriers inserted at each despatch station.

The invention is more specifically explained in the following description taken in conjunction with the accompanying drawings, in which Fig. 1 shows schematically a simple form of a pneumatic conveyor system according to the invention, illustrating the general idea, Fig. 2 is a longitudinal section through a spacing device, Fig. 3 is a cross section on line III—III in Fig. 2, Figs. 4 and 4a show in side elevation a modified spacing device, Fig. 5 shows a diagram of the controlling circuit for the spacing device, Fig. 4, Fig. 6 shows schematically a despatch unit and its branch loop in relation to the main line, Fig. 7 shows on a larger scale and in longitudinal section a despatch unit, Fig. 8 is a cross section on line VIII—VIII in Fig. 7, Fig. 9 shows a longitudinal section of a modified manner of construction of the despatch unit, Fig. 10 is a cross section on line X—X in Fig. 9, Fig. 11 shows in side elevation a part of the system including a receiving unit and a despatch unit with pertinent parts, Fig. 12 is a plan elevation of the parts shown in Fig. 11.

Fig. 13 shows in side elevation a modified manner of the arrangement, a branch loop including a receiving unit and a despatch unit above a floor and the main line below the floor, Fig. 14 is a sectional view of a diverting unit, Fig. 15 shows on a large scale and in longitudinal section the despatch unit included in the arrangement shown in Fig. 11, Fig. 16 is a longitudinal section through a traffic guard, and Fig. 17 is a diagram of the electrical control system of the pneumatic conveyor device according to the invention.

Fig. 18 shows the choke valve and bypass-tubes.

Fig. 19 shows schematically the traffic control device.

Figure 1:
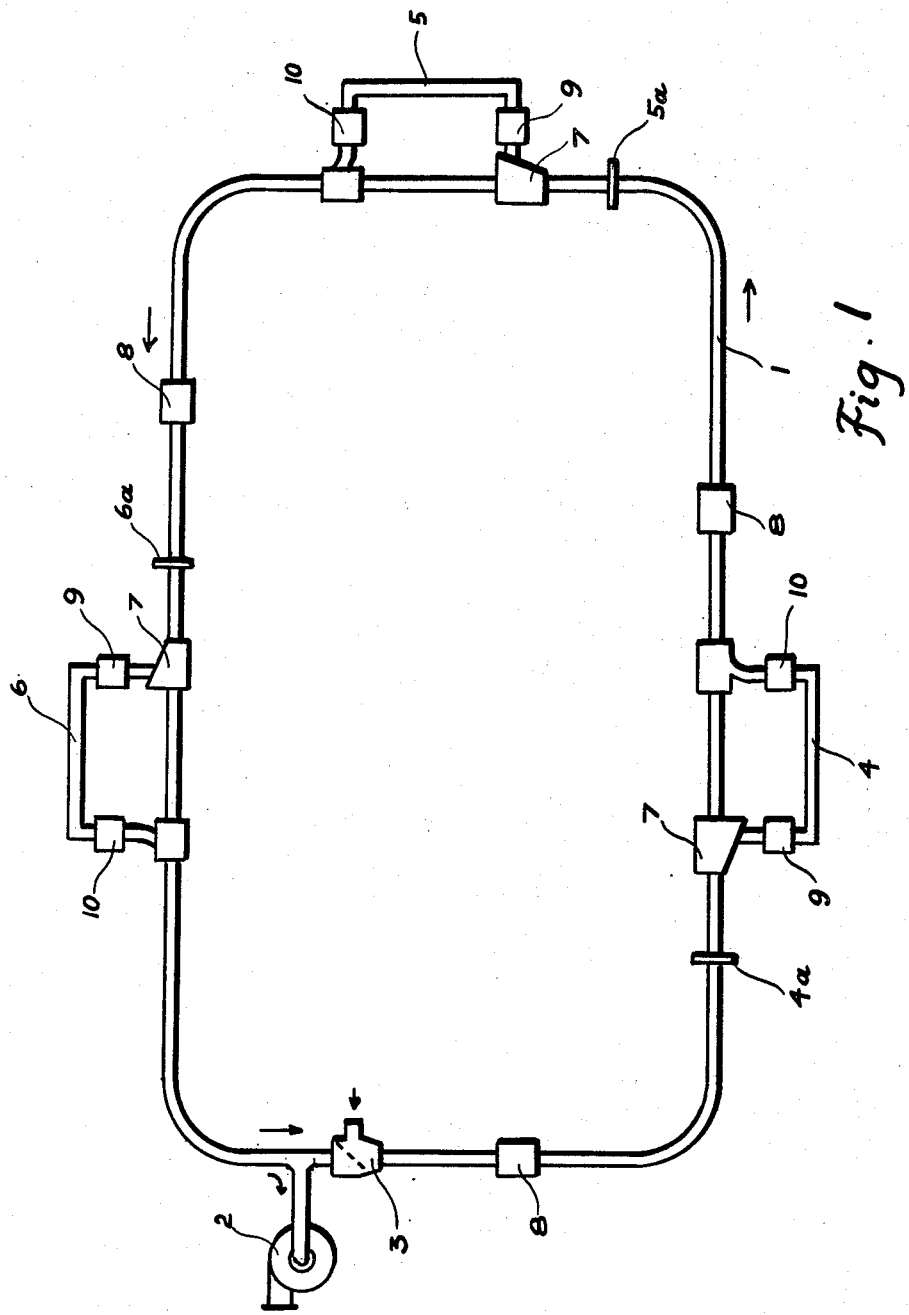

Referring to Fig. 1, the numeral 1 indicates a conveyor tube formed as a closed circuit to a suction plant 2 of any appropriate type, and provided with an air inlet 3. By means of this suction plant a continuous flow of air in the direction indicated by the arrows is obtained throughout the entire length of the conveyor tube.

At various predetermined points along the main line "1" there are provided loop branches 4, 5 and 6, each including a receiving fitting 9 and a despatching fitting 10. Each branch loop has at its inlet end a deviating unit 7, and at its outlet end a junction unit 11 connecting the branch to the main line 1. 8 indicates a spacing device by means of which the distance between the carrier is regulated. Associated with each loop branch 4 is a device 4a, 5a, 6a, fitted to the main line 1 which serves as detector, selector, and traffic guard.

In this loop branch 4, 5 and 6, there is no air flow except when the deviating unit 7 is in its operative position. This happens for brief periods whenever a carrier is about to be received or to be dispatched, by automatic means to be described later. This deviating process does not cause an interruption or a weakening of the air circuit flow at any point of the entire plant.

A detailed description of the various units 7, 8 and 10, as well as their operation is given in the description further below, but briefly the system operates in the following manner. A carrier of conventional type is inserted into a despatch unit of e. g. station loop 4 and is conveyed into the main line 1 by means of an air flow temporarily diverted from the main line and directed through the loop branch. The spacing unit 8 between station 4 and station 5 will in the manner described later take care that the carrier does not collide with any other carrier in the main line. If the carrier in question is destined for station 6, the deviating unit 7 at station 5 will by selecting means not included in the present invention, be adjusted to allow the carrier to proceed past station 5. The spacing unit 8 between stations 5 and 6 will take care that the carrier does not collide with any carrier in this part of the main line, and the deviating unit 7 at station 4 will by selecting means direct the carrier into the station loop 6, where it reaches the receiving unit 9 at this station. It will readily be understood that carriers may be despatched from a station to any other station along the common main line.

In Figs. 2 and 3 is shown one manner of construction of a spacing unit 8. To the exterior of the main line 1 is rigidly attached a short tube 11 which is closed at each end by means of caps 12 and 13 respectively. Inside this fixed tube 11 is disposed a tubular insertion 14 which is shorter than the exterior tube 11 and has a longitudinal slot 15. The insertion is rotatable in tube 11 by means of a finger 16 projecting through an elongated hole 17 in the wall of the main line 1 and against the action of a coil spring 18 the ends of which are connected to the one end of the insertion 14 and the adjacent end cap 12. The exterior tube 11 has an elongated slot 19 so disposed that upon rotation of the insertion 14 by means of finger 16 the slot 15 of the insertion may be caused to overlap more or less the slot 19 in the exterior tube 11. In order to lock the insertion 14 after being rotated by means of finger 16 to a position in which the slots 15 and 19 overlap each other, there is provided a two-armed lever fulcrumed to an extension 20 on the exterior tube 11, one arm 21 being shaped as a hook which normally by gravity engages the one end of the slot 19 bearing upon the outer surface of the insertion 14, but when this member is rotated so that its slots overlap slot 19, the hook will drop into the insertion slot 14 and thus lock the insertion in this position. For again releasing the insertion 14, there is provided a small electromagnet 22 for which the depending end 23 of the two-armed lever serves a armature.

This spacing unit operates in the following manner. Assuming the device to be inactive, i. e. the finger 16 projects into the main line 1, and the slot 15 in the insertion 14 is displaced so as not to overlap slot 19 in the exterior tube 11, a carrier sliding along the main line 1 will, upon reaching the spacing device, strike finger 16 and deflect it so that insertion 14 is rotated. When slots 15 and 19 coincide, atmospheric air enters the main line. Thus a volume of air will be drawn into the main line comparable to the air flow therein. The area of flow through the apertures may be limited or extended by means of an adjustment screw (not shown). The lever 21, 23 then locks the insertion in its operative position for a brief period, dependent on the desired spacing, and controlled by means of a suitable switch device inserted in the main line so as to be operated by the carrier for exciting the electromagnet 22. This magnet attracts the armature end 23 of the lever 21, 23 thus releasing the insertion 14, which by means of spring 18 is rotated to its initial position and thus cutting the air intake. It is obvious that the effect of the air intake is a transitional acceleration of the first carrier and a temporary deceleration of the speed of the carrier(s) following behind the first carrier, whereby the distance between the former and the latter is increased.

A modified spacing device relying on mechanical and electronical means only is illustrated in Figs. 4 and 4a.

25, 26, and 27 indicate parts of the main line, and 28 and 29 indicate the ends of a by-pass loop connecting the main line parts 25 and 27 to each other. The loop end 28 is connected to a valve 30 interconnecting the main line parts 25 and 26, and provided with a spring-loaded flap (not visible) and loop end 29 is connected to another valve 31 interconnecting the main line parts 26 and 27. The intermediate main line part 26 has a slightly smaller diameter than parts 25 and 27 so as to provide increased braking force to a carrier passing through this part of the main line. To line part 26 near valve 31 are attached fittings 32 and 33, each containing an interceptor lever 34 and 35 respectively that are fulcrumed at their centres and each has a spring bias, so that they may easily be displaced by a carrier travelling through line part 26. Near the path periphery of these interceptor levers are arranged stoppers 36 and 37 respectively, which are integral with armatures 38a of magnets 38 and 39 respectively. When one of these magnets is excited, the pertinent stopper moves into the pathway in front of the interceptor so that it can no longer be displaced and will, therefore, stop the progress of a carrier passing through the line part 26. The terminals of these magnets 38 and 39 are indicated by $a$, $b$ and $c$, $d$ respectively.

The fitting nearest the valve 27 is furthermore provided with a contactor box 40 including a triggering blade 41 and a contact device 42 with terminals $e$ and $f$.

Normally only magnet 39 is excited so that only interceptor lever 35 is locked in the neutral position, so that only interceptor lever 34 allows a carrier to pass. A carrier after passing through the one-way valve 30, enters the tube 26 in which the dynamic momentum of the carrier is reduced by pneumatic and mechanical braking forces until it is finally stopped by interceptor lever 35, and the same time the carrier will actuate the trigger blade 41 to close contact 42. Referring now to the diagram in Fig. 5 it will be noted that when contact terminals $e$ and $f$ are being short-circuited, two relays $g$ and $h$ will be energised and remain so by means of holding contacts $i$. Electromagnet 38 is energised, while electromagnet 39 is de-energised and thus releases the interceptor lever 35 which thus allows the carrier to proceed. As electromagnet 38 is energised it will block the path of the interceptor lever 34 and any carrier entering line part 26 will be intercepted and retained there. The holding contacts $i$ also supply a magnetic or electronic delay-circuit by means of a high ohmic variable resistance $j$, a condenser $k$ and a glow lamp $m$. When the glow lamp flashes the condenser will discharge through a relay $n$ which opens a contact $o$ and closes a contact $p$, the latter serving only to short-circuit the glow lamp $m$. When contact $o$ opens, relay $g$ and $h$ fall off, interceptor lever 34 is released, and interceptor lever 35 is again locked. The carrier intercepted by lever 34 will now move to lever 35 by means of which it is again stopped. The carrier displaced the triggering plate 41 thus closing contacts $e$ and $f$ with the above described result of releasing lever 35 to allow the carrier to proceed. The time interval between restarting the first and the second carrier is dependent on the setting of the variable resistor $j$. In Fig. 5, $q$—$q$ indicate neon stabilisors to maintain the supply voltage at a steady level.

Fig. 6 shows a branch loop line 44 rising from a convenient height (at which the despatch station is fitted) and joining the main line 43 near the ceiling in a manner more fully described below.

In order to prevent the braking of the air flow when a carrier is to be introduced into the line at any of the stations of the circuit, a despatch station 45 is proposed which combines simplicity and reliability. Such a despatch station is shown in Figs. 7 and 8 and comprises a cylinder 46 which fits around the branch line 44 and at each end has a packing flange 47 with a retainer ring 48. The cylinder 46 has at one side an extension chamber 49 provided with an aperture 50 which is closed by means of a spring loaded felt lid 51 fitted with a handle 52. The extension chamber 49 has an external handle 53 by means of which the cylinder and chamber may be rotated on the branch line 44. The extension chamber 49 is dimensioned to hold a carrier 54 which may be inserted through the aperture 50 after opening the lid 51. The lid is immediately closed by means of a spring 55.

The branch line 44 has an aperture 56 sufficiently large to allow the carrier 54 to pass through it, and before inserting a carrier into the chamber 49, the cylinder 46 is turned to such a position that this aperture 56 is entirely closed by a cylinder wall. After insertion into the chamber 49 of the carrier, the cylinder 46 is rotated by means of handle 53, until aperture 56 communicates with the chamber 49 and the carrier 54 will drop into the branch line 44 where it will rest upon a buffer arrangement. The carrier will drop into branch line 44 if the latter has an angular inclination against the perpendicular, in the manner indicated in Fig. 6, or, if the base of the ante-chamber 49 is suitably slanted. The said buffer is arranged within an extension 58 of the cylinder 46 and consists of a spring-actuated lever 57 fulcrumed in such a manner that the lever arm projects through a hole 58 in the tube wall. The lever is arranged to operate the contact device 59 for a relay unit. When the carrier bears upon the lever 57, its weight will depress this lever to close the contacting device 59, thus closing an electric circuit (the "despatch-triggering circuit," see later) through the relay unit which relays power supply to a solenoid for a valve unit which deviates the air flow into the branch line 44, as described below.

To prevent opening of lid 51 when the cylinder 46 is turned away from its initial position, there is provided a fixed guard ring 60, Fig. 8, which surrounds the cylinder 46 and is spaced above the lid 57. This ring is attached to a fixed part and has a cut-away portion disposed above the lid 51 when the extension chamber 49 is returned to its initial position, thus allowing the lid to be opened in this position only. This guard ring 60 may render unnecessary the application of a return spring on the cylinder 14.

When the contact 59 is closed by means of the depressed lever 57, the resulting electrical impulse into the relay will cause the solenoid of a two-way valve 62, (also called "diverting unit") to be energised and thereby the airflow to be directed through the tube branches 44—44 (Fig. 6). The complete despatch relaying operation and circuit will be described further below.

A modified manner of construction of a despatch unit particularly intended for horizontal stations is shown in Figs. 9 and 10. The main line is here designated by 63 and has a rectangular aperture 64. This apertured part of the main line is surrounded by a tube 65 provided with an aperture 66 corresponding to aperture 64 and rotatable on brass rings 67 attached to the main line. The aperture 64 in the main tube 63 is framed with metal strips 68, thus providing a kind of packing that allows only very little air to escape between the adjacent members. A housing 69 of substantially U-shaped cross section surrounds the coaxial tube system 63, 65 with its base part and is provided with a suitable packing 70 in relation to the said coaxial tube system. The upwardly extending walls and ends of the housing form a container 71 which is upwardly closed by means of a lid 72 provided with a felt coating 73 on its inner side. The packings 70 and the felt-coating 73 provide an airtight closure of the housing. The lid 72 is attached to the housing by means of hinges 74. A relieve valve comprising a spring-loaded valve pin 75 is provided in the lid.

This valve pin is connected to a lever 76 pivotally attached to the housing at 77 so that when the lever is raised by means of a handle 78, the relief valve is opened to equalize pressure inside and outside the container 71, thus enabling the lid to be easily raised for the insertion of a carrier into the container 71. After insertion of a carrier the exterior tube 65 is rotated by means of the handle 65a until apertures 64 and 66 coincide, thus allowing the carrier to drop into the main tube 63, and the exterior tube 65 is rotated back to its initial position by means of the handgrip 78.

If the described despatch unit is fitted into a loop line 44—44 such as shown in Fig. 6, a contactor device may be arranged in the tube line below the unit, in the same way as shown in Fig. 7 (57, 58). If the unit is horizontal as shown in Fig. 9, the sleeve with the operating handle 65a may have a cam-like extension which on the return stroke of the handle would actuate a contactor device (not shown) and thereby cause the air-flow to be diverted through this despatch unit. An automatic delay circuit would re-establish the normal, flow-less, condition after a short, and adjustable lapse of time.

To prevent rotation of the exterior tube 65 before the lid 72 is closed, suitable interdependent locking means may be provided.

The entire traffic controlled despatch system will now be described in greater detail in connection with the flow diversion system.

Figure 17:
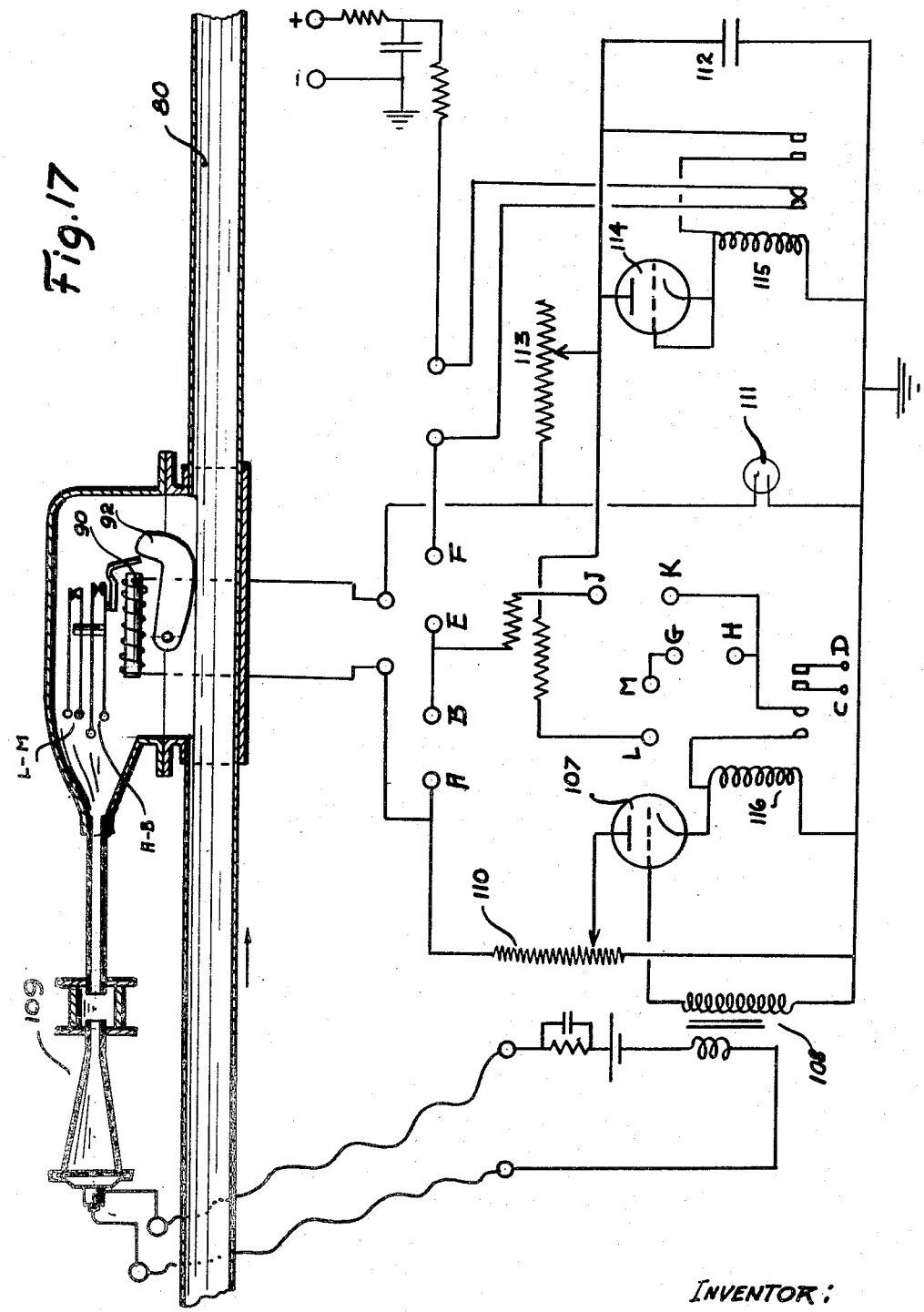

Referring particularly to Figs. 11 and 12, the general transmission line 80—in the following called the main line—may be imagined to run through a series of rooms at ceiling level. A combined despatch-receiving station is illustrated in Fig. 11 and comprises a receiving unit indicated generally by 81 and a despatch unit 82. The receiving unit has a discharge flap 83 from which a carrier is discharged into a tray, not shown. Furthermore, the system includes a diverting unit 84 provided with an interior flap 85, and a junction unit 86 by means of which the despatch tube 87 connects the despatch unit 86 to the main line 80. A further part of the system is a relay unit, the circuit of which is shown in Fig. 17.

The selecting means employed for directing the moving carrier to a pre-determined station is assumed to be an acoustic system, but any other known selecting system may be used and is therefore not described in the present application, as it does not form a part of the invention as such. A still further part of the system is a traffic guard 87 which is shown in detail in Fig. 16 and comprises a housing 88 communicating with the interior of the main line 80. The housing has a duct 89 communicating with the acoustic selecting system (not shown). Inside the housing 88 there is an electric relay comprising an electro-magnet 90 and an armature 91. A lever 92 is fulcrumed inside the housing at 93 and is so curved that it extends into the main line 80 back into the housing with its free end in close proximity to the armature 91. Whenever a carrier 94 passes along the main line 80 in the direction indicated by the arrow 95, Fig. 16, it will press the lever 92 upwardly into the housing 88, and the free end of the lever will press the armature 91 inwardly against the pole of the electromagnet 90. An arm 96 on the said armature will at the same time close a contact A—B, which apart from applying a voltage to the control unit, Fig. 17, also energises the electromagnet 90 so that the armature 91 is retained in its displaced position, and the contacts A—B will remain closed after the carrier has passed by the traffic guard 87, Fig. 11.

The diverting flap 85 within the diverting unit 84 moves between two parallel, flat surfaces 84a (Fig. 12) with little clearance between the parts, and when the diverting flap is in the horizontal position it prevents the passage of air from the main line into the branch tube leading to the receiving station 83, and it prevents the passage of air into the part of the main line 80 intermediate the diverting unit 84 and the junction unit 86, when the diverting flap is in its raised position.

A further feature of the diverting flap 85 is to balance the static pressure within the system. As shown in Fig. 11 the flap 85 is pivoted somewhat near its middle to prevent it being pressed by the air flow to its upper position when once lifted, so that it would be difficult to return to its lower position. The flap 85 is controlled by means of an electromagnet 97 with terminals C—D, see Fig. 17.

The receiving unit 81 is connected to the despatch unit 82 by means of a tube connection 98. Furthermore, the receiving unit has a contact device with break contacts E—F operated by means of any suitable lever device 99, acted upon by a carrier entering the unit. The despatch unit 82 is provided with contacts G—H, which are closed by means of a lever acted upon by a carrier when inserted into the despatch unit as described in connection with Fig. 7.

For purposes of traffic controlled timing of despatches, there is incorporated into the despatch unit 82 a device preventing a carrier from being moved by an air flow in the despatch branch 87 as long as the lid 100 is open. This device consists of a pulley 101 mounted e. g. on the same platform as the contactor E—F and over which pulley is carried a wire 102, one end of which outside the mounting platform is attached to a tension spring 103, the other end being carried through a recess in the interior wall of the unit and attached to the lid 100. The pulley 101 carries an excentrically disposed pivot 104 for an arm 105. When the lid is in its closed position, the arm remains retracted to leave the interior of the despatch unit free, but as soon as the lid 100 is opneed, the pulley is rotated and the arm protrudes into the despatch unit as shown in dotted lines in Fig. 15, thus preventing the displacement of a carrier inserted into the unit, as long as the lid is open. As the carrier may be sucked into the despatch line with considerable force, the arm 105 must enter into the interior of cylinder 82 under a certain minimum angle to balance the created frictional resistance in accordance with the line-of-force diagram indicated in Fig. 15. The pressure exerted by the carrier on arm 105 produces a turning momentum on the pulley, which acts in the same sense as the bias spring 103 assisting same to retract arm 105 as soon as lid 100 is being closed.

The junction unit 86 is provided with a contactor 106 with its terminals J—K.

Referring more particularly to the diagram shown in Fig. 17 which illustrates the circuit of the central steering unit associated with each send-receive station loop, there is a signal detector 107, preferably a cold cathode glow lamp with or without a control grid. If a control grid is employed it is connected to the secondary winding of a step-up transformer 108, the primary winding of which is connected to the circuit of e. g. an acoustic selector unit 109. If no grid is employed the secondary transformer windings will be in series with the plate voltage, which is derived from a variable tapping on a potentiometer 110. Normally no voltage is applied to this potentiometer 110, but when a carrier passes through the traffic guard 87, contacts A—B are closed thus providing direct connection between A and the positive pole of a high tension D—C supply. The result of this can be enumerated:

(a) High tension applied to signal detector 107
(b) Relay holding windings of electromagnet 90
(c) A signal lamp 111 will light
(d) A condenser 112 causing another glow lamp 114 to strike after a certain adjustable expanse of time to discharge the said condenser 112 through a relay 115, and thus break the direct current supply.

This arrangement renders the detector valve insensitive to any spurious signal all the time there is no carrier between the traffic guard 87 and the diverting unit 86. Consequently any accidental operation of the relay is excluded.

On arrival of the carrier at the traffic guard 87, the whole circuit becomes sensitive and is ready to accept an external impulse. Presuming the controlling impulse is the sound note of a particular pitch emitted by the carrier, the filter or selector 109 must be constructed to resonate with this particular pitch. Vibrations in the microphone of the selector 109 are translated into electrical alternating current stepped up in transformer 108 and applied to grid of the signal detector 110. This detector will "strike" and pass current through a relay 116 thereby closing two contact pairs, one pair of which serves to connect the coil windings of the relay directly to the D. C. supply through a resistance 117, the other pair CD serving to energise the solenoid windings of the power magnet 97, see Fig. 11.

There will be an unavoidable small delay between the triggering of the detector glow lamp by the selective signal and the moment when the diverting flap 85 in the diverting unit 84 is fully raised, but the traffic guard 87 may be inserted into the main line at a safe distance to ensure that a carrier, when arriving at the selected station, will not strike the diverting flap 85 during its movement to its upper position.

When the carrier enters the receiving unit 81 and prior to its opening the discharge flap 83, it displaces a trigger in a trigger housing 118, Fig. 11, thereby opening the contact EF and thus interrupting the high tension supply holding relay 116 and consequently cutting the load circuit over contact CD so that the diverting flap 85 will return to its lower position for passage straight through the main line.

The sequence of operations when despatching a sender is as follows:

Referring to Fig. 11, the despatch station lid 100 is opened and the carrier inserted into the despatch unit 82 after which the lid is closed by means of its spring. During the short period the flap 100 is open, atmospheric air is admitted to the interior of the duct 89, but means are provided to prevent this inrushing air from displacing the carrier in an uncontrolled manner. These means consist of the arresting mechanism 101—105, Fig. 15, previously described. As soon as the lid 100 is fully closed the carrier is mechanically free to move forward but owing to the absence of an air flow in duct 89, the carrier would remain stationary. However, the carrier, when inserted will as shown in Fig. 7, press lever 57 outwards to close contacts G—H (Fig. 11 and 17), causing high tension D. C. voltage to be applied to relay 116 via contactor E—F—J—K—H—G—M—L relay 116— earth, (contacts ML are in the traffic guard unit, JK in the junction unit 86). Contacts LM and JK are normally closed. The diverting flap 85 is thus caused to rise (since power contacts CD are now closed) to its upper position and diverts the air flow through the loop branch to move the carrier along the duct 89 to the main line 80, and when it passes the contact device 106 in the junction unit, contacts JK are opened thus cutting the circuits just described, and the diverting flap 85 drops back to its lower position again.

It remains to be explained what happens when another carrier just on passage through the main line approaches the station loop of the considered despatch station.

As already described in connection with Fig. 16 the lever 92 is displaced by means of the electromagnet 90 every time a carrier bears upon the lever 92, and therefore the despatch triggering circuit F—E—J—K—H— G—L—M etc. will be open for the period predetermined by the earlier described timing circuit, even if contacts GH are closed during the process of inserting a carrier for despatch. If therefore a person inserts a carrier for despatch at a moment of time when another carrier on passage in the main line has just passed the traffic control point (i. e. traffic guard unit), the closing of the despatch contacts H—H will have no effect and the carrier inserted into the despatch box will remain at rest until the circuit for the relay 116 is completed again when the said time period has expired. Thus time period may be set at any length between 1 and 6 seconds by adjusting a dial on the relay unit so that it is possible to provide for ample allowance for locally prevailing traffic conditions.

The signal lamp 111 will light, when the controlled section of the main line is blocked. An electromagnetical lock may be provided at the despatch lid 100 in parallel with the signal lamp, so that the lid cannot be opened as long as another carrier is within the controlled section.

In order to simplify the traffic guard unit, it is possible to transfer the relay arrangement 90 with contactors M—L and A—B into a separate box, or as a part of the circuit-buildup, Fig. 17. Only a triggering contact and lever 92 remain in the traffic guard.

Fig. 13 shows an example of a station loop arrangement, where the main transmission line is placed at a level lower than the receiver and despatch units.

The diverting unit 119 at the inlet end of the loop is constructed as a two-way valve and is seen on the left hand side of Fig. 13. The receiving branch tube 120 rises to the receiving unit 121 where the air path is continued through the tube link 122, the dispatch unit 123 and the dispatch branch tube 124, which again drops to join the main tube line 125.

The despatch unit 123 is of the antechamber type Fig. 7, but the previously described flap type shown in Fig. 15 may also be used. When the handle 126 of the discharge unit is turned, the carrier inserted through the lid 127 will drop into the despatch channel, simultaneously, a contactor GH is operated which charges a condenser between G and earth (condenser not shown in Fig. 17). This condenser is immediately discharged through relay 116 if the traffic controlled line is free. If a carrier is within the traffic controlled line, e. g. when the despatch triggering circuit EJKHGML—116—earth is interrupted at LM, the condenser will hold its charge until the glow lamp 114 (controlling the period of delay) strikes whereupon contacts LM close as described earlier and the condenser discharges through relay 116 and the diverting unit 119, Fig. 13, operates. The temporarily diverted airflow takes the inserted carrier away.

Fig. 14 shows a section view from above of the diverting unit 112.

It consists of a frame 128 closed at top and bottom by means of two perfectly parallel and plane covers 129 and 130. Between these plates, a two-armed lever 131 is mounted on a fulcrumed pin 132 and arranged to turn easily but leaving little clearance for air to pass between itself and the side covers 129 and 130. When the lever is turned into the position shown in Fig. 14 in the manner described in connection with Fig. 11, the air seal is completed by two felt pads 133—133, equally spaced from pin 132. The process of stopping a carrier by the interceptor arm of the spacer must not be too abrupt, otherwise the device would soon be destroyed.

It is necessary to arrange for a preceding slowing down of the carrier, but the various known methods are not very suitable as they necessitate a change of direction of the tube line, or incorporate an involved valve system.

Therefore, a combined braking and spacing device is proposed, which is identical with the one described in Fig. 4 with the only difference that the course of the air flow by-passing the spacing device is changed so that this part of the air flow is directed through the main line only, but in the opposite direction.

As Fig. 18 shows, a choke valve 134 reduces the outlet cross section of a by-pass tube 135 to an adjustable value with the purpose of forcing the flow partly through a branch 136 and from there up the main line 137 as shown by arrow 138 and back through a second by-pass tube 139 which joins the main-tube at the lower end below a valve 140 in the main line.

When a carrier coming from the top pushes through a spring loaded valve flap 141 it drops into that section of the "braking tube" which contains the upwardly flowing air, which will quickly reduce the speed of the carrier. If the air stream is too intensive, the carrier may stop altogether. By means of the choke valve 134 the right amount of the by-pass can be adjusted so as to land the carrier on an interceptor arm 142 as gently as possible.

The efficiency of this arrangement is co-determined by the maximum possible spring loading of the lower flap in valve 138, which load must be less than the weight of the empty carrier and the inertia effect of the air column flowing in the main line 137 by-pass tube 139. Whereas the former factor determines the maximum possible positive pressure increase in front of the carrier, the latter creates a transitional negative pressure suction behind the carrier. The sum of both is the initial braking force. Conditions may be chosen so as to cause the carrier to be stopped over a short braking distance whereupon the carrier would slowly drop until finally checked by the spacers.

Fig. 19 shows schematically the interdependent parts of the traffic control device in which 143 is the traffic guard, 144 the electric circuit, 145 is the diverting device including the two way valve, 146 is the detector, and 147 indicates the despatch contacts, all as described earlier in the specification.

I declare that what I claim is:

1. In a pneumatic tube conveyor system, the combination of a single tube guide serving a number of sending and receiving stations, a blower generating a perpetual flow of air throughout said tube guide, carriers propelled therein by the air stream and equipped with a pathfinding device, spacing devices inserted at one or more points of said tube guide to separate successive trains of carriers, fittings in the tube guide which act as carrier-responsive detector and relay, an electronic control unit at each station, an airflow and carrier-diverting gate inserted into the main tube guide and energized by said carrier-responsive detector and control unit, a receiving branch tube and a sending branch tube normally sealed off from the main tube guide by said gate except upon operation of said carrier-operated gate which forces the total air flow through said gate into a carrier receiving branch guide, from there into the sending branch guide and back into the main tube guide, means for causing the gate to operate also upon insertion of a carrier into the sending branch guide, means for cancelling the said operation of the gate upon the insertion of a carrier into the sending branch if and as long as another carrier on passage through the main guide and not intended to arrive at the considered station loop, is within an adjustable short distance from said sending station.

2. In a conveyor system as claimed in claim 1, an airflow- and carrier-diverting gate comprising a two-armed, electro-magnetically operated lever with flat side portions moving between parallel fixed surfaces, and provided with seals transversally sealing off the end portions of said lever when set to one or the other of its end positions, at such distances from the axle that the differential pressures acting on the sealed-off areas of the two arms of the lever are equal.

3. In a pneumatic tube conveyor system, the combination of a single tube guide serving a number of sending and receiving stations, a blower generating a perpetual flow of air throughout said tube guide, carriers propelled thereby and equipped with a pathfinding device, spacing devices inserted at one or more points of said tube guide to separate successive trains of carriers, fittings in the tube guide which act as carrier-responsive detector and relay, an electronic control unit at each station, an air-flow and carrier-diverting unit at each station inserted into the main tube guide and energized by said carrier-responsive detector and control unit, a traffic guard contactor disposed in the main tube line near said carrier responsive detector at a pre-determined distance from said gate unit, to mediate the impulse of a passing carrier at this point to the traffic regulating circuit, a receiving branch and a sending branch normally sealed off from the main tube by said gate except upon operation of said gate, means for causing the gate to operate upon insertion of a carrier into the sending branch guide, means for cancelling the said operation of the gate upon another carrier travelling in the main tube guide reaching said traffic guard contactor and means for retaining this condition of cancellation of the gate operation for an adjustable period of time.

4. In a conveyor system as claimed in claim 1, the combination of a loop containing a sending fitting with a carrier-actuated contactor disposed in said fitting which mediates the excitation of the gate-operating electric circuit prior to the dispatch of the carrier from the sending fitting.

5. In a conveyor system as claimed in claim 3, the combination of a special local electric circuit interconnecting the station fittings with a traffic guard contactor unit inserted in the main tube guide which combination is arranged electrically in such a manner that the effect of the sending contactor is cancelled for a predetermined time when the former had been actuated by a carrier in the main line before the carrier to be dispatched actuates the sending contactor in the sending fitting.

6. In a pneumatic tube conveyor system, the combination of a single tube guide serving a number of sending and receiving stations, a blower generating a perpetual flow of air throughout said tube guide, carriers propelled therein by the air stream and equipped with a pathfinding device, spacing devices inserted in said tube guide consisting of self acting carrier-operated air valves provided with a trigger operated by a passing carrier to open the valve and to allow atmospheric air to be drawn into the tube guide, means for temporarily arresting the valve in its open position in order to separate and space successive trains of carriers, fittings in the tube guide which act as carrier responsive detector and relay, a traffic guard contactor in the main line, an electronic control unit at each station, an air-flow- and carrier-diverting gate inserted into the main tube guide and energized by said carrier responsive detector, receiving and sending branch tubes normally sealed off from the main tube guide except upon operation of said gate when the total airflow passes through said station loop, means for causing the gate to operate also upon insertion of a carrier for dispatch at a sending station and for cancelling this operation to become effective if a carrier on transit in the main tube and near the station has previously actuated the traffic guard contactor.

7. In a pneumatic conveyor system as claimed in claim 6, a spacing device consisting of two interceptor units having displaceable interceptor fingers protruding into the main guide line which fingers can be locked electromagnetically, a carrier-operated contactor near these interceptors, said contactor causing said two interceptors to be alternately locked and unlocked upon arrival there of a carrier, the timing of this cycle being initiated by the arrival of a carrier and adjustable by setting a timing circuit.

8. In a pneumatic conveyor system, the combination of a single tube guide serving a number of sending and receiving stations, a blower generating a perpetual flow of air throughout said tube guide, carriers propelled therein by the air stream and equipped with a pathfinding device, a traffic guard fitting and fittings in the tube guide which act as carrier-responsive detector and relay, and electronic unit at each station, an airflow- and carrier-diverting gate inserted into the main tube guide at each station and electromagnetically actuated by said carrier responsive detector at that station, a receiving branch tube containing a receiving terminal fitting and a sending branch tube normally sealed off from the main tube guide, said sending branch fitted with a dispatch unit comprising a sleeve tube rotatable on the sending branch tube and provided with an extension chamber having an inlet aperture closed by means of a spring-loaded flap, said rotatable tube having an aperture which communicates with the said extension chamber and with an aperture in the sending branch tube upon rotation of the rotatable sleeve tube, thus permitting a carrier inserted into the extension chamber to enter the conveyor tube, a contactor device cooperating with the rotatable part of the said sleeve tube to cause the air flow via the diverting gate to be diverted through said sending unit, means for cancelling the said operation of the air flow diversion through said unit if, and as long as, another carrier in passage through the main tube guide and not intended to arrive at the considered receiving terminal, coincidentally passes the traffic guard fitting and the local traffic-controlled section of the main line in close proximity to said station fittings.

9. In a pneumatic conveyor system as claimed in claim 8, in which the dispatch chamber comprises an outer tube member coaxially arranged for rotation on the conveyor branch tube and sealed in relation thereto, equally sized apertures formed in the two tubes, external means for rotating the said outer tube for displacing its aperture in relation to the aperture in the conveyor tube, a housing mounted on the conveyor tube and provided with an aperture in alignment with the aperture of the conveyor tube, and a spring-loaded lid.

10. In a pneumatic tube conveyor system, the combination of a single tube guide serving a number of stations, a blower generating a perpetual flow of air throughout said tube guide, carriers propelled therein by the air stream and equipped with a pathfinding device, fittings in the tube guide which act as carrier-responsive detectors, traffic guard contactors near said detectors, an electronic control unit at each station, an airflow- and carrier-diverting gate inserted at each station into the main tube guide and electromagnetically actuated by said carrier-responsive detector and control unit, a receiving branch tube and a sending branch tube normally sealed off from the main tube guide by said gate except upon operation of the carrier-controlled gate forcing the total air flow through said inlet junction into the carrier receiving branch guide, the carrier sending branch guide and back into the main line, means for preventing a carrier inserted through the trap door of the sending fitting from being driven or pulled into said branch line by the air suction resulting from the transitional opening of the dispatch door, means for causing the air flow to be diverted through the loop line upon insertion of a carrier into the dispatch fitting except a carrier in the main tube has actuated a traffic guard contactor within an adjustable passage of time.

11. In a conveyor system as claimed in claim 10, the connection of the lid of the dispatch unit with a stopper arm, synchronising the entering of said arm into the interior of the dispatch unit with the opening of the lid, and retracting said locking arm when the lid is being closed.

12. In a conveyor system as claimed in claim 10, a stopper arm excentrically pivoted, on a spring-loaded pulley, which by means of a flexible wire is connected to the lid of the dispatch unit.

References Cited in the file of this patent

UNITED STATES PATENTS

| | | |
|---|---|---|
| 44,107 | Needham | Sept. 6, 1864 |
| 141,294 | Siemens | July 29, 1873 |
| 398,836 | Lieb | Mar. 5, 1889 |
| 489,931 | Clay | Jan. 17, 1893 |
| 1,797,651 | Gergacsevics et al. | Mar. 24, 1931 |
| 2,150,440 | Hargreaves | Mar. 14, 1939 |

FOREIGN PATENTS

| | | |
|---|---|---|
| 488,593 | Germany | Jan. 9, 1930 |
| 696,124 | Germany | Sept. 12, 1940 |